United States Patent [19]
Yamamura

[11] Patent Number: 5,784,522
[45] Date of Patent: Jul. 21, 1998

[54] INFORMATION SIGNAL TRANSMITTING SYSTEM

[75] Inventor: Kazumasa Yamamura, Kanagawa, Japan

[73] Assignee: Sony Corporation, Tokyo, Japan

[21] Appl. No.: 626,846

[22] Filed: Apr. 3, 1996

[30] Foreign Application Priority Data

Apr. 7, 1995 [JP] Japan .................................. 7-082840

[51] Int. Cl.⁶ .............................. H04N 5/76; H04N 7/08; H04N 7/087
[52] U.S. Cl. .................. 386/46; 386/95; 348/474; 348/478
[58] Field of Search ........................ 386/1, 46, 94, 386/95, 83, 96; 348/7, 13, 464, 474, 478, 722, 14, 17, 18; 358/908; 455/3.1, 41.1, 45; 379/93.17, 93.24, 93.25, 93.28, 102.02; H04N 5/76, 5/92, 5/93, 7/08, 7/087

[56] References Cited

U.S. PATENT DOCUMENTS

| | | | |
|---|---|---|---|
| 4,520,404 | 5/1985 | Kohorn | 386/94 |
| 4,605,973 | 8/1986 | Kohorn | 386/94 |
| 5,134,496 | 7/1992 | Schwab et al. | 386/94 |
| 5,510,900 | 4/1996 | Shirochi et al. | 386/94 |
| 5,568,275 | 10/1996 | Norton et al. | 386/52 |
| 5,646,603 | 7/1997 | Nagata et al. | 386/83 |
| 5,659,653 | 8/1997 | Diehl et al. | 386/46 |

*Primary Examiner*—Andrew I. Faile
*Assistant Examiner*—Luong Nguyen
*Attorney, Agent, or Firm*—Frommer Lawrence & Haug LLP; William S. Frommer

[57] ABSTRACT

An information signal transmitting system for transmitting information signals including video and audio signals over a transmission line has a transmitting apparatus for transmitting information signals, and a receiving apparatus for receiving information signals transmitted from the transmitting apparatus. The transmitting apparatus having a recording start and stop command signal generator for generating a recording start command signal and a recording stop command signal, and a transmitter for transmitting an information signal which needs to be saved in the receiving apparatus, with a recording start command signal inserted therein for at least a predetermined period of time, and transmitting an information signal which does not need to be saved in the receiving apparatus, with a recording stop command signal inserted therein for at least a predetermined period of time. The receiving apparatus has a reception controller for separating the recording start command signal and the recording stop command signal from the received information signals, and a recording device for recording received information signals depending on the recording start command signal and the recording stop command signal separated by the reception controller.

6 Claims, 13 Drawing Sheets

INFORMATION SIGNAL TRANSMITTING SYSTEM

BACKGROUND OF THE INVENTION

1. Field of the Invention

The present invention relates to an information signal transmitting system for transmitting information signals including video and audio signals from video tape footage recorded in the field for news coverage such as of events, accidents, etc., from a news gathering location to a broadcasting station or the like.

2. Description of the Related Art

For news coverage such as of a news event, accident, etc., it has been general practice for a camera operator and a reporter to either carry a field pickup (FPU) device including a video camera or ride a transmission mobile unit equipped with an FPU device, go to the site, and gather video and audio information of the event with the video camera to produce video tape footage.

In order to broadcast the news from a broadcasting station, footage video and audio signals from the recorded video tape footage are transmitted from the field to the broadcasting station through a transmission line of an either electronic news gathering (ENG) system or a satellite news gathering (SNG) system, and then recorded by a video tape recorder in the broadcasting station.

In the broadcasting station, the transmitted footage video and audio signals are edited into a complete news story, which will be broadcast as a news broadcast to television audiences.

The video and audio signals from the recorded video tape footage contain many unnecessary or faulty scenes that obviously do not need to be transmitted to the broadcasting station.

However, it has been customary to transmit all the footage video and audio signals which contain many unwanted or erroneous scenes as well as important scenes from the field to the broadcasting station. Therefore, after all those footage video and audio signals have been transmitted from the field to the broadcasting station, the crew on site and the editor in the broadcasting station need to confirm necessary scenes among all the footage takes through a lengthy and tedious exchange of conversations over a telephone line or the like about time codes, specific image scenes, and other shot details.

Therefore, the conventional ENG or SNG practice has been disadvantageous in that it requires such a timeconsuming exchange of confirming information between the sender and receiver of footage video and audio signals. In addition, the fee for using the transmission lines of the ENG and SNG systems to transmit the video tape footage including unnecessary or faulty scenes is relatively high.

SUMMARY OF THE INVENTION

It is therefore an object of the present invention to provide an information signal transmitting system which will dispense with a time-consuming and tedious exchange of confirming information between the sender and receiver of information signals such as footage video and audio signals, and will minimize any payment for using a transmission circuit to transmit unnecessary information signals.

According to the present invention, there is provided an information signal transmitting system for transmitting information signals including video and audio signals over a transmission line, comprising a transmitting apparatus for transmitting information signals, and a receiving apparatus for receiving information signals transmitted from the transmitting apparatus, the transmitting apparatus having recording start and stop command signal generating means for generating a recording start command signal and a recording stop command signal, and transmitting means for transmitting an information signal which needs to be saved in the receiving apparatus, with a recording start command signal inserted therein for at least a predetermined period of time, and transmitting an information signal which does not need to be saved in the receiving apparatus, with a recording stop command signal inserted therein for at least a predetermined period of time, the receiving apparatus having recording start and stop command signal separating means for separating the recording start command signal and the recording stop command signal from the received information signals, and recording means for recording received information signals depending on the recording start command signal and the recording stop-command signal separated by the recording start and stop command signal separating means.

With the above arrangement, a recording start command signal is inserted in each of information signals that need to be saved in the reception apparatus and a recording stop command signal is inserted in each of the information signals that do not need to be saved in the reception apparatus, and these information signals are transmitted from the transmission apparatus to the reception apparatus. The reception apparatus records only those information signals in which a recording start command signal is inserted. Consequently, only those information signals that need to be saved in the reception apparatus are recorded, and no time-consuming and tedious exchange of confirming information about the contents of the information signals is required between the operators of the transmission and reception apparatus.

According to the present invention, there is also provided an information signal transmitting system for transmitting information signals including video and audio signals over a signal transmission channel, comprising a transmitting apparatus for transmitting information signals, and a receiving apparatus for receiving information signals transmitted from the transmitting apparatus, the transmitting apparatus comprising a signal reproducing device for reproducing the information signals, means for generating data indicative of selected ones of the information signals reproduced by the signal reproducing device, a transmission controller having a data memory for storing the data, and means for adding the data read from the data memory to the information signals reproduced by the signal reproducing device, the receiving apparatus comprising separating means for separating the data from the information signals transmitted from the transmitting apparatus, and a recording device for recording information signals based on the data separated by the separating means.

DETAILED DESCRIPTION OF THE PREFERRED EMBODIMENTS

Figure 1:
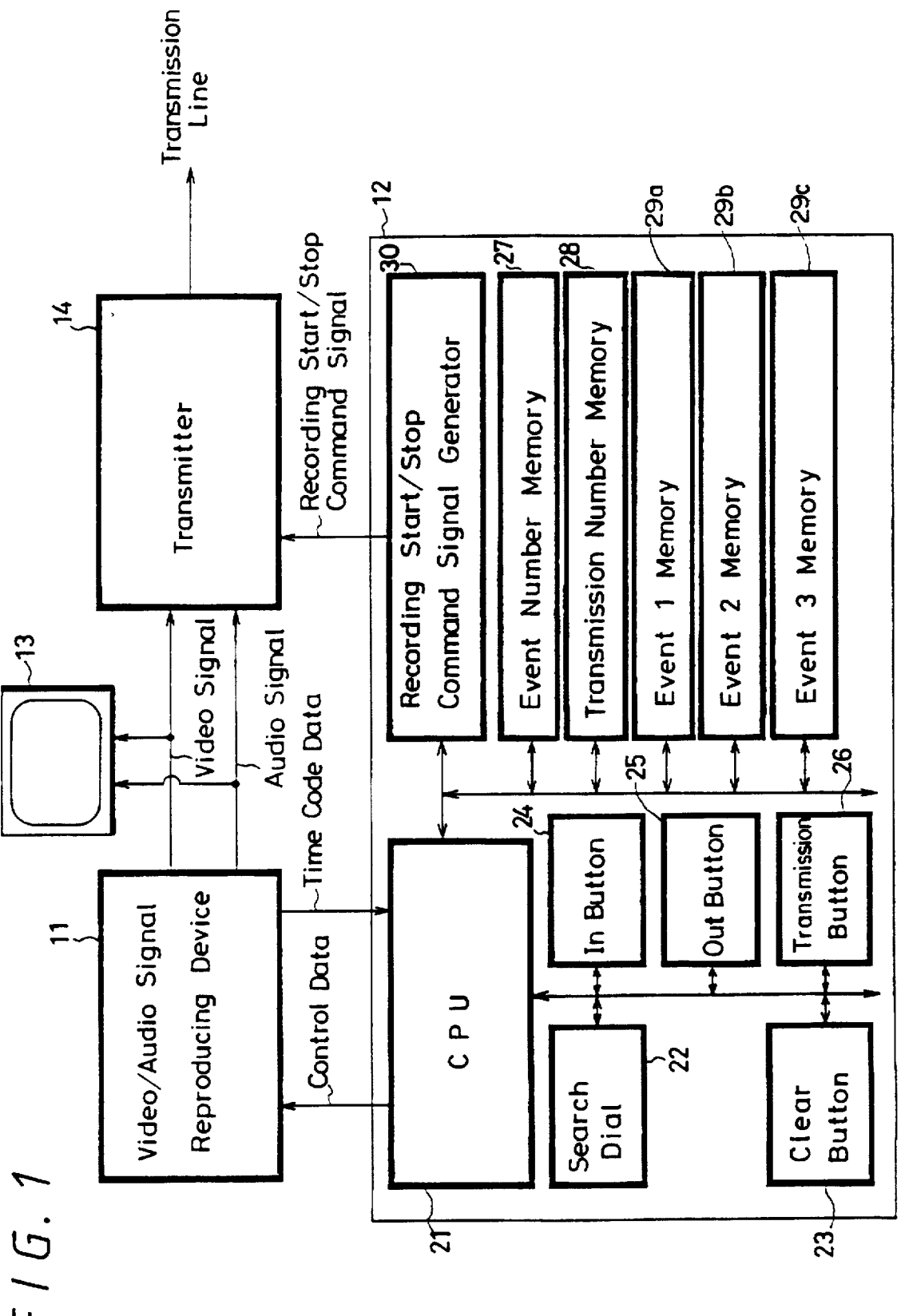
FIG. 1 is a block diagram of a transmission apparatus of an information signal transmitting system according to the present invention.

FIG. 1 shows a transmission apparatus of an information signal transmitting system according to the present invention. As shown in FIG. 1, the transmission apparatus includes a video/audio signal reproducing device 11 such as a video tape recorder or the like for playing back a footage video tape produced in the field for news coverage such as of events accidents, etc.

The video/audio signal reproducing device 11 is controlled by control data from a central processing unit (CPU) 21 of a transmission controller 12 for playing back, rewinding, accessing scenes in, and stopping the footage video tape. Video and audio signals reproduced by the video/audio signal reproducing device 11 are monitored on a monitor unit 13, and supplied to a transmitter 14 for transmission to a transmission line.

Time code data contained in the footage video tape and produced by the video/audio signal reproducing device 11 are supplied to the CPU 21 of the transmission controller 12.

The transmission controller 12 has, in addition to the CPU 21, a search dial 22 for controlling the movement of a playback point on the footage video tape in the video/audio signal reproducing device 11, a clear button 23 for resetting an event number in an event number memory 27 (described later on), an IN button 24 for storing the time codes of IN points in an event 1 memory 29a, an event 2 memory 29b, ... (described later on) which are indicated, an OUT button 25 for storing the time codes of OUT points in the event 1 memory 29a, the event 2 memory 29b, ... which are indicated, and a transmission button 26 for starting to transmit information signals. The controller 12 also has an event number memory 27 for storing event numbers, a transmission event number memory 28 for storing an event number that is to be transmitted, and a plurality of event memories including an event 1 memory 29a for storing IN and OUT points of an event 1 represented by an information signal that needs to be stored in a reception apparatus, an event 2 memory 29b for storing IN and OUT points of an event 2 represented by an information signal that needs to be stored in the reception apparatus, an event 3 memory 29c for storing IN and OUT points of an event 3 represented by an information signal that needs to be stored in the reception apparatus, . . . .

According to the present invention, the controller 12 further includes a recording start/stop command signal generator 30 for generating a recording start command signal and a recording stop command signal to be supplied to the transmitter 14.

Figure 2:
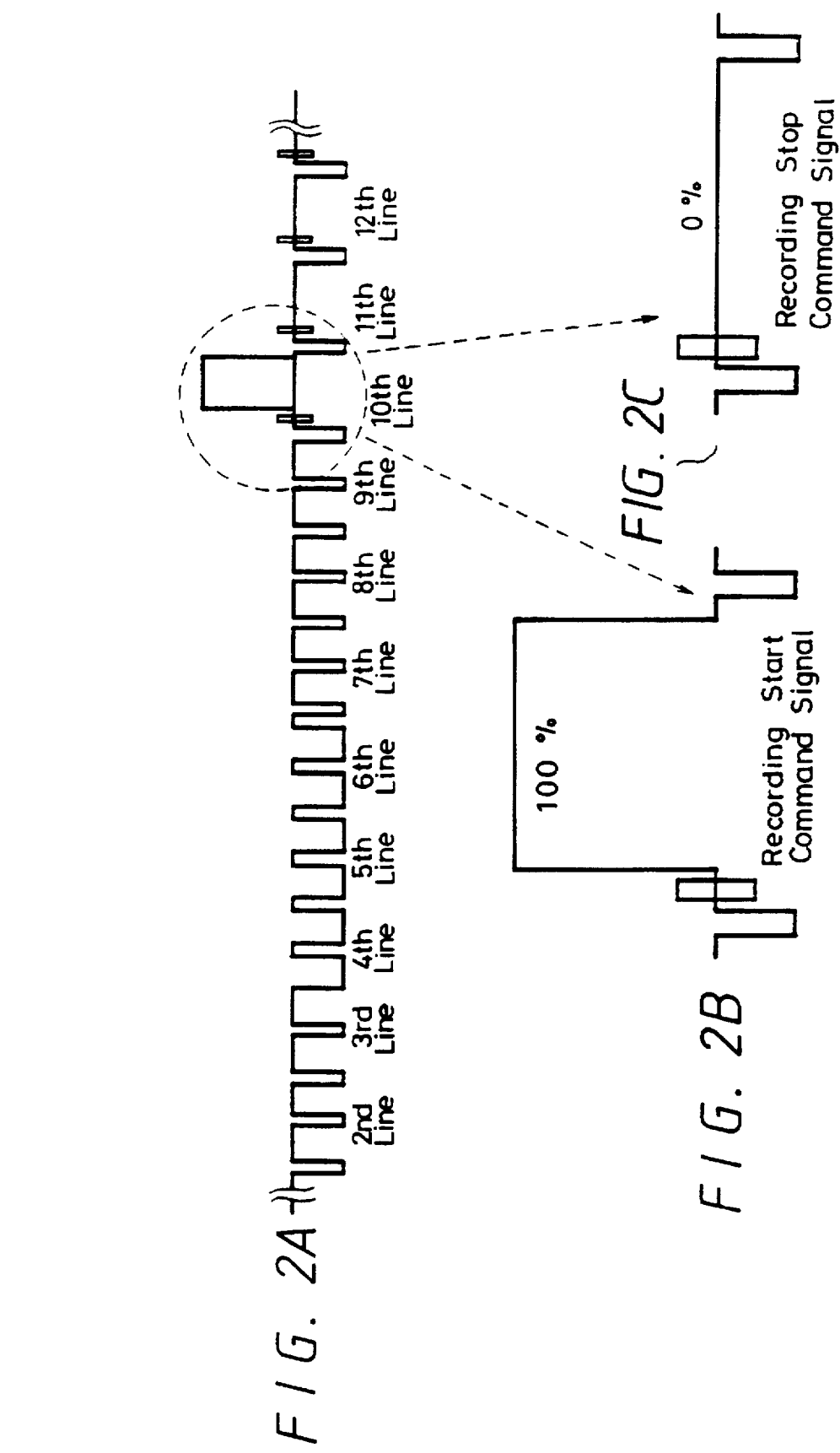
FIGS. 2A, 2B and 2C are diagrams showing the waveform of a video signal transmitted by the transmission apparatus shown in FIG. 1.

As shown in FIGS. 2A and 2B, the recording start command signal may comprise a 100% luminance level signal inserted in a vertical blanking interval, e.g., a 10th-line video signal period, of a video signal. As shown in FIGS. 2A and 2C, the recording stop command signal may comprise a 0% luminance level signal inserted in a vertical blanking interval, e.g., a 10th-line video signal period, of a video signal.

Figure 3:
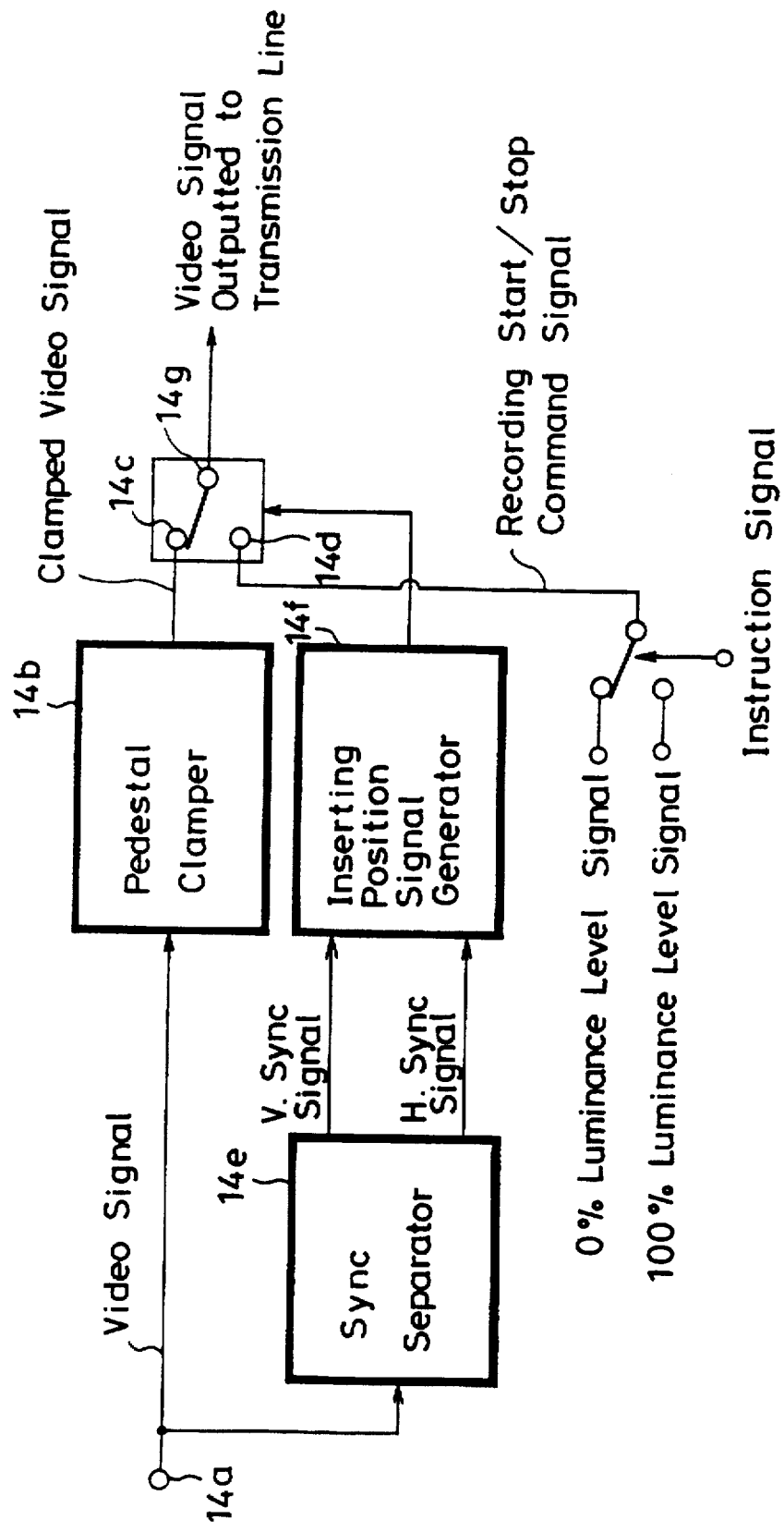
FIG. 3 is a block diagram of a transmitter of the transmission apparatus shown in FIG. 1.

The recording start command signal and the recording stop command signal generated by the recording start/stop command signal generator 30 are inserted into the video signal by the transmitter 14 as shown in FIG. 3.

FIG. 3 shows the transmitter 14 in detail. The video signal, to be transmitted, from the video/audio signal reproducing device 11 is supplied to a video signal input terminal 14a. The video signal supplied to the video signal input terminal 14a is applied to a pedestal damper 14b which sets the pedestal level, for example, of the supplied video signal to a constant level. The video signal outputted from the pedestal clamper 14b is supplied to a fixed contact 14c of a selector switch.

The recording start command signal, e.g., a 100% luminance level signal, or the recording stop command signal, e.g., a 0% luminance level signal, is supplied to another fixed contact 14d of the selector switch.

The video signal supplied to the video signal input terminal 14a is also supplied to a synchronizing separator 14e, which separates a vertical synchronizing signal and a horizontal synchronizing signal from the supplied video signal. The vertical synchronizing signal and the horizontal synchronizing signal outputted from the synchronizing separator 14e are supplied to an inserting position signal generator 14f. The inserting position signal generator 14f produces an inserting position signal corresponding to a 10th-line video signal period in a vertical blanking interval of the video signal, and controls the selector switch to connect a movable contact 14g thereof to the other fixed contact 14d for the period of the inserting position signal. During a period of the video signal other than the period of the inserting position signal, the movable contact 14g is connected to the fixed contact 14c for thereby transmitting the video signal from the movable contact 14g to the transmission line.

Figure 4:
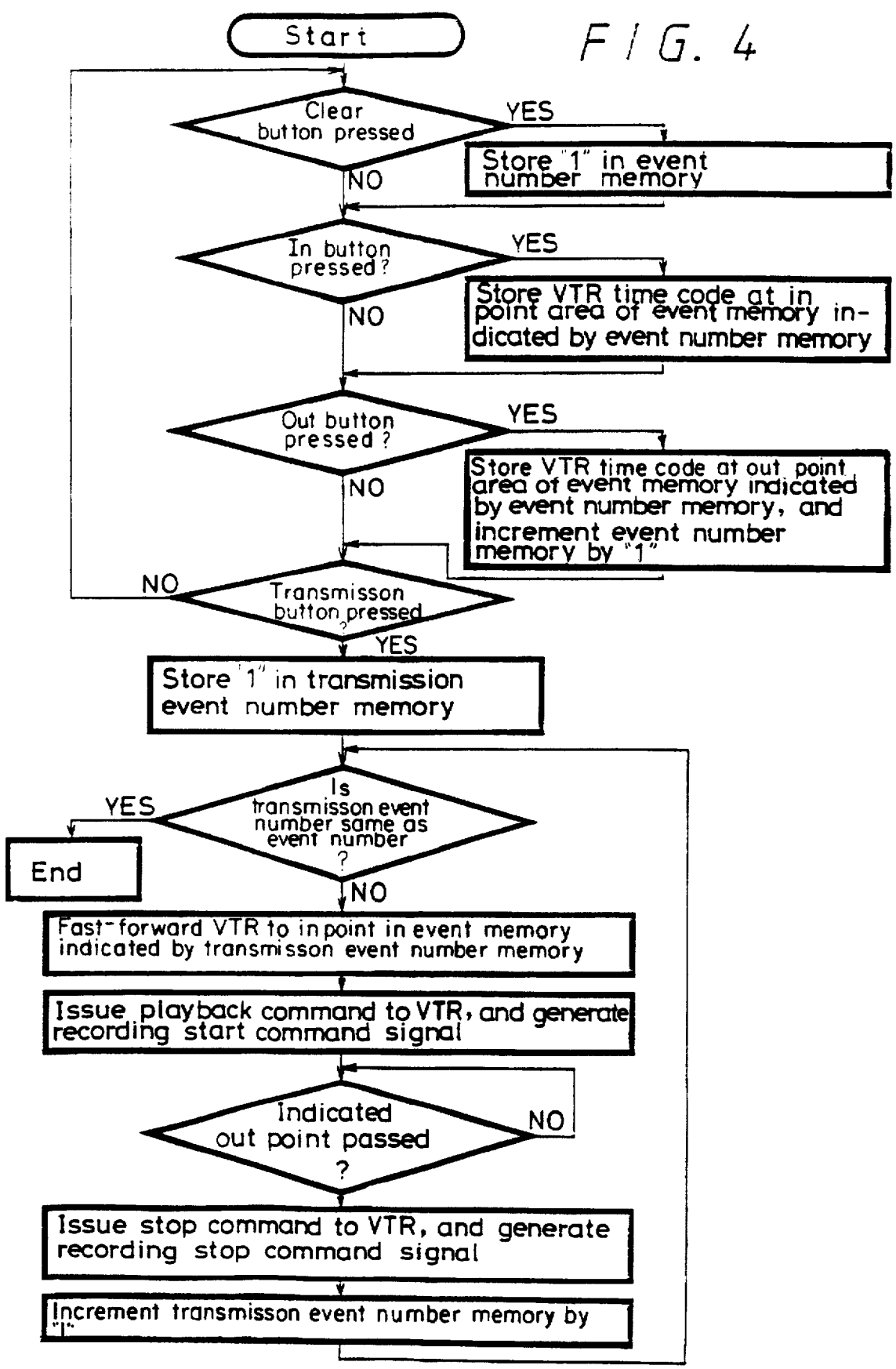
FIG. 4 is a flowchart of an operation sequence of the transmission apparatus shown in FIG. 1.

Operation of the transmission apparatus shown in FIG. 1 for transmitting a video signal will be described below with reference to a flowchart shown in FIG. 4. The operator of the transmission apparatus, i.e., the sender, first operates the clear button 23 to reset the transmission apparatus for signal transmission. When the clear button 23 is pressed, an event number "1" is stored in the event number memory 27 as shown in FIG. 4.

Figure 5:
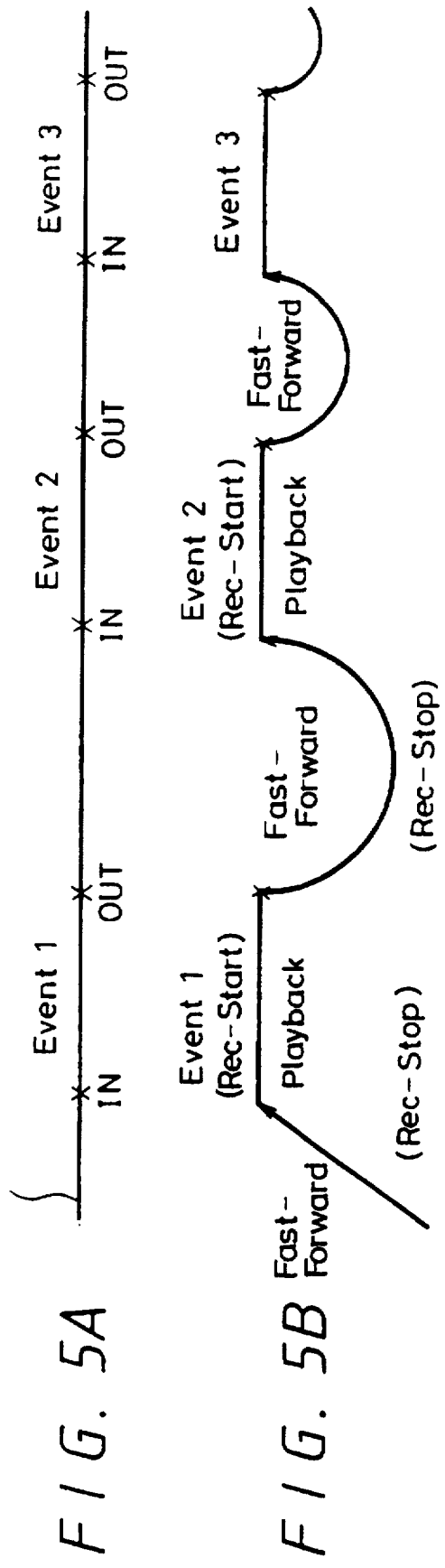
FIGS. 5A, 5B, and 5C are diagrams illustrative of the principles of operation of the information signal transmitting system according to the present invention operates.

It is assumed here that a footage video tape contains footage information signals as shown in FIG. 5A and information signals representing scenes that need to be saved in a reception apparatus are indicated by an event 1, an event 2, and an event 3 shown in FIGS. 5A, 5B, and 5C.

The sender operates the video/audio signal reproducing device 11 in a playback mode to play back the footage video tape, and, while monitoring the reproduced image on the monitor unit 13, presses the IN button 24 when the reproduced image reaches the start of the event 1, i.e., an IN point thereof. When the IN button 24 is pressed, a time code outputted from the video/audio signal reproducing device 11 at this time is stored in an IN point storage area of the event 1 memory 29a which is indicated by the event number memory 27.

The sender continuously monitors the reproduced image on the monitor unit 13, and presses the OUT button 25 when the reproduced image reaches the end of the event 1, i.e., an OUT point thereof. When the OUT button 25 is pressed, a time code outputted from the video/audio signal reproducing device 11 at this time is stored in an OUT point storage area of the event 1 memory 29a which is indicated by the event number memory 27. The event number stored in the event number memory 27 is incremented by "1", and hence an event number "2" is stored in the event number memory 27.

The sender continuously monitors the reproduced image on the monitor unit 13, and presses the IN button 24 when the reproduced image reaches the start of the event 2, i.e., an IN point thereof. When the IN button 24 is pressed, a time code outputted from the video/audio signal reproducing device 11 at this time is stored in an IN point storage area of the event 2 memory 29b which is now indicated by the event number memory 27.

The sender continuously monitors the reproduced image on the monitor unit 13, and presses the OUT button 25 when the reproduced image reaches the end of the event 2, i.e., an OUT point thereof. When the OUT button 25 is pressed, a time code outputted from the video/audio signal reproducing device 11 at this time is stored in an OUT point storage area of the event 2 memory 29b which is indicated by the event number member 27. The event number stored in the event number memory 27 is incremented by "1", and hence an event number "3" is stored in the event number memory 27.

Similarly, the event 3 memory 29c stores time codes of IN and OUT points of the event 3 in its IN and OUT point storage areas, respectively, in the manner described above. The event number stored in the event number memory 27 is incremented by "1", and hence an event number "4" is stored in the event number memory 27.

Thereafter, the sender rewinds the footage video tape back to a predetermined position in the video/audio signal reproducing device 11, and then operates the transmission button 26. When the transmission button 26 is pressed, a transmission event number "1" is stored in the transmission event number memory 28.

At this time, the transmission event number "1" stored in the transmission event number memory 28 is not the same as the event number "4" stored in the event number memory 27. The video/audio signal reproducing device 11 is operated in an access mode (fast-forward mode) so as to access or reach the IN point of the event 1 which is stored in the IN point storage area of the event 1 memory 29a that is indicated by the transmission event number memory 28. When the IN point of the event 1 is reached, the video/audio signal reproducing device 11 is operated in the playback mode (see FIG. 5B), and at the same time the recording start/stop command signal generator 30 generates a recording start command signal, e.g., a 100% luminance level signal, which is inserted in a vertical blanking interval, e.g., a 10th-line video signal period, of the video signal.

The recording start command signal is continuously inserted until the OUT point of the event 1 stored in the OUT point storage area of the event 1 memory 29a. When the OUT point of the event 1 is reached, the video/audio signal reproducing device 11 pauses, and at the same time the recording start/stop command signal generator 30 generates a recording stop command signal, e.g., a 0% luminance level signal, which is inserted in a vertical blanking interval, e.g., a 10th-line video signal period, of the video signal.

The transmission event number stored in the transmission event number memory 28 is incremented by "1", and hence a transmission event number "2" is stored in the transmission event number memory 28. At this time, the transmission event number "2", stored in the transmission event number memory 28 is not the same as the event number "4" stored in the event number memory 27. The video/audio signal reproducing device 11 is operated in the access mode (fast-forward mode) so as to access or reach the IN point of the event 2 which is stored in the IN point storage area of the event 2 memory 29b that is indicated by the transmission event number memory 28. When the IN point of the event 2 is reached, the video/audio signal reproducing device 11 is operated in the playback mode (see FIG. 5B).

Until the IN point of the event 2 is reached, a recording stop command signal, e.g., a 0% luminance level signal, is inserted in a vertical blanking interval, e.g., a 10th-line video signal period, of the video signal. When the video/audio signal reproducing device 11 is operated in the playback mode, the recording start/stop command signal generator 30 generates a recording start command signal, e.g., a 100% luminance level signal, which is inserted in a vertical blanking interval, e.g., a 10th-line video signal period, of the video signal.

The recording start command signal is continuously inserted until the OUT point of the event 2 stored in the OUT point storage area of the event 2 memory 29b. When the OUT point of the event 2 is reached, the video/audio signal reproducing device 11 pauses, and at the same time the recording start/stop command signal generator 30 generates a recording stop command signal, e.g., a 0% luminance level signal, which is inserted in a vertical blanking interval, e.g., a 10th-line video signal period, of the video signal.

The transmission event number stored in the transmission event number memory 28 is incremented by "1", and hence a transmission event number "3" is stored in the transmission event number memory 28. At this time, the transmission event number "3" stored in the transmission event number memory 28 is not the same as the event number "4" stored in the event number memory 27. The video/audio signal reproducing device 11 is operated in the access mode (fast-forward mode) so as to access or reach the IN point of the event 3 which is stored in the IN point storage area of the event 3 memory 29c that is indicated by the transmission event number memory 28. When the IN point of the event 3 is reached, the video/audio signal reproducing device 11 is operated in the playback mode (see FIG. 5B).

Until the IN point of the event 3 is reached, a recording stop command signal, e.g., a 0% luminance level signal, is inserted in a vertical blanking interval, e.g., a 10th-line video signal period, of the video signal. When the video/audio signal reproducing device 11 is operated in the playback mode, the recording start/stop command signal generator 30 generates a recording start command signal, e.g., a 100% luminance level signal, which is inserted in a vertical blanking interval, e.g., a 10th-line video signal period, of the video signal.

The recording start command signal is continuously inserted until the OUT point of the event 3 stored in the OUT point storage area of the event 3 memory 29c. When the OUT point of the event 3 is reached, the video/audio signal reproducing device 11 pauses, and at the same time the recording start/stop command signal generator 30 generates a recording stop command signal, e.g., a 0% luminance level signal, which is inserted in a vertical blanking interval, e.g., a 10th-line video signal period, of the video signal.

The transmission event number stored in the transmission event number memory 28 is incremented by "1", and hence a transmission event number "4" is stored in the transmission event number memory 28. At this time, the transmission event number "4" stored in the transmission event number memory 28 is the same as the event number "4" stored in the event number memory 27. Therefore, the transmitting operation of the transmission apparatus is finished. The information signal as shown in FIG. 5B is transmitted by the transmission apparatus to the transmission line.

Figure 6:
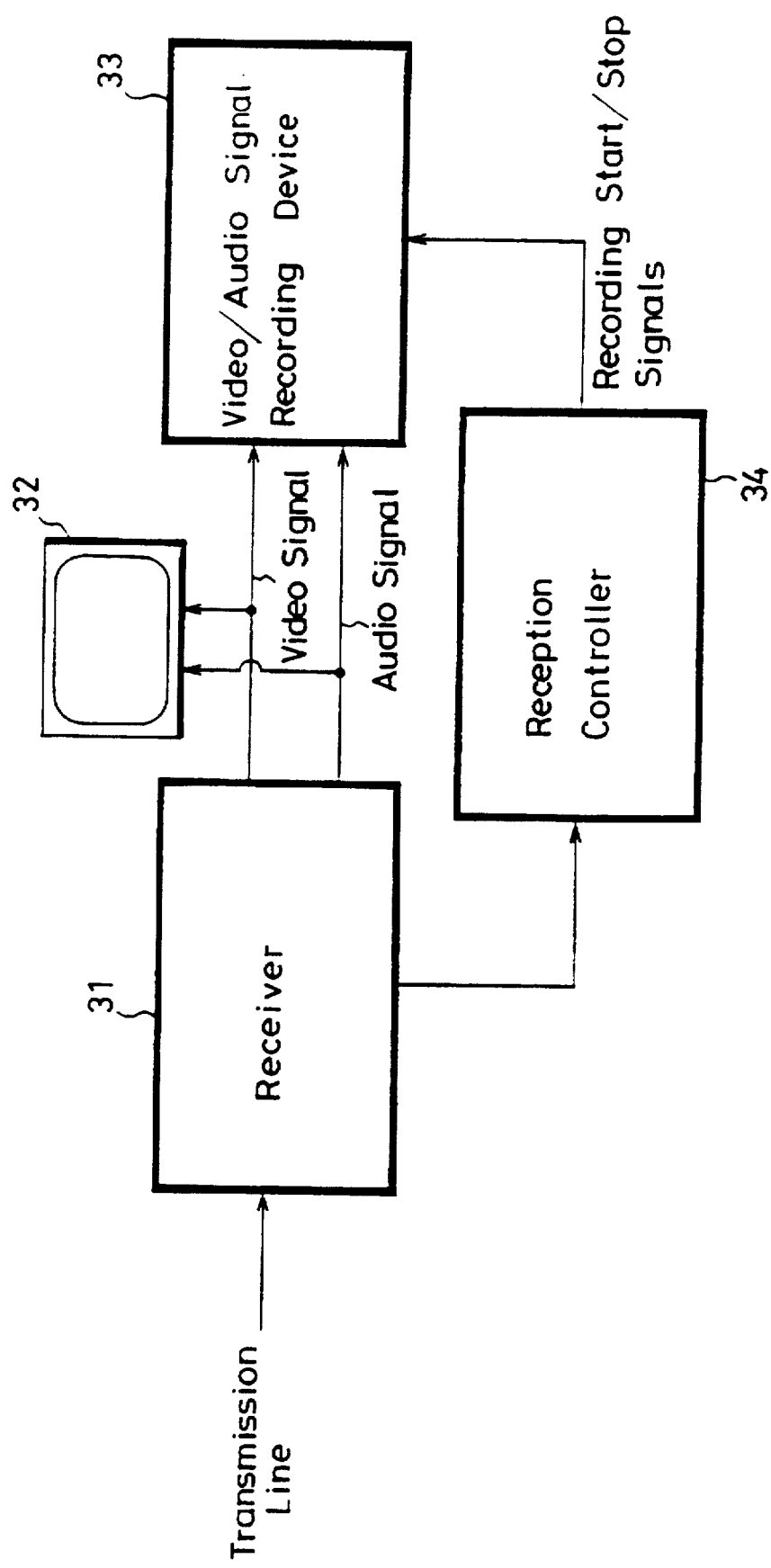
FIG. 6 is a block diagram of a reception apparatus of the information signal transmitting system according to the present invention.

The information signal transmitting system according to the present invention has a reception apparatus as shown in FIG. 6. As shown in FIG. 6, the reception apparatus has a receiver 31 for receiving an information signal which has been transmitted from the transmission apparatus shown in FIG. 1 over the transmission line. Video and audio signals outputted from the receiver 31 are monitored on a monitor unit 32, and supplied to a video/audio signal recording device 33 such as a video tape recorder or the like, which records the supplied video and audio signals.

The video/audio signal recording device 33 is controlled for its recording and stopping operation by a reception controller 34. Specifically, the reception controller 34 detects recording start and stop command signals contained in the transmitted signals, and controls the video/audio signal recording device 33 to record and stop recording the transmitted signals based on the detected recording start and stop command signals.

Figure 7:
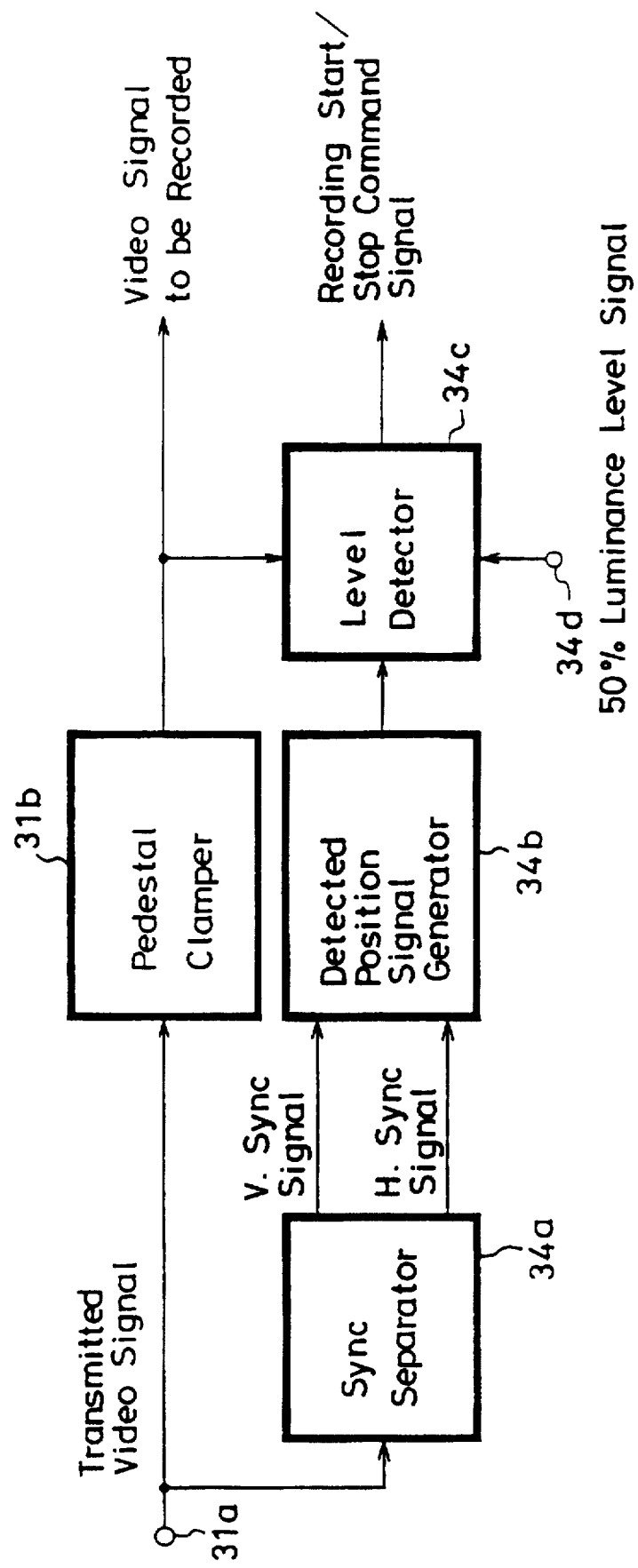
FIG. 7 is a block diagram of a receiver and a reception controller of the reception apparatus shown in FIG. 6.

The receiver 31 and the reception controller 34 are shown in detail in FIG. 7. As shown in FIG. 7, the video signal received by the receiver 31 is supplied to a video signal input terminal 31a. The video signal supplied to the video signal input terminal 31a is applied to a pedestal clamper 31b which sets the pedestal level, for example, of the supplied video signal to a constant level. The video signal outputted from the pedestal damper 31b is supplied, as a video signal to be recorded, to the video/audio signal recording device 33 and also supplied to a level detector 34c.

The video signal supplied to the video signal input terminal 31a is also supplied to a synchronizing separator 34a, which separates a vertical synchronizing signal and a horizontal synchronizing signal from the supplied video signal. The vertical synchronizing signal and the horizontal synchronizing signal outputted from the synchronizing separator 34a are supplied to a detected position signal generator 34b. The detected position signal generator 34b produces a detected position signal corresponding to a 10th-line video signal period, for example, in a vertical blanking interval of the video signal.

The detected position signal outputted from the detected position signal generator 34b is supplied to the level detector 34c. The level detector 34c compares the detected position signal with a 50% luminance level signal supplied to a reference signal input terminal 34d to detect recording start and stop command signals. The video/audio signal recording device 33 is controlled for its recording and stopping operation according to the recording start and stop command signals detected by the level detector 34c.

Even if the information signal recorded on the footage video tape contains unnecessary scenes between the events as shown in FIG. 5A, the information signal recorded on a video tape in the transmission apparatus contains a succession of the events 1, 2, 3, free of any of the unnecessary scenes, as shown in FIG. 5C.

The information signal recorded on the video tape in the transmission apparatus is only an information signal that needs to be saved in the transmission apparatus, and does not require the sender at the transmission apparatus and the operator of the reception apparatus, i.e., the receiver, to exchange lengthy and time-consuming conversations with respect to the contents of the information signals.

Furthermore, the transmission apparatus transports the footage video tape in the access mode (fastforward) for those unnecessary scenes which will not be needed in the reception apparatus. Accordingly, the information signal transmitting apparatus according to the present invention is effective to minimize any payment for using a transmission circuit to transmit unnecessary information signals.

Figure 8:
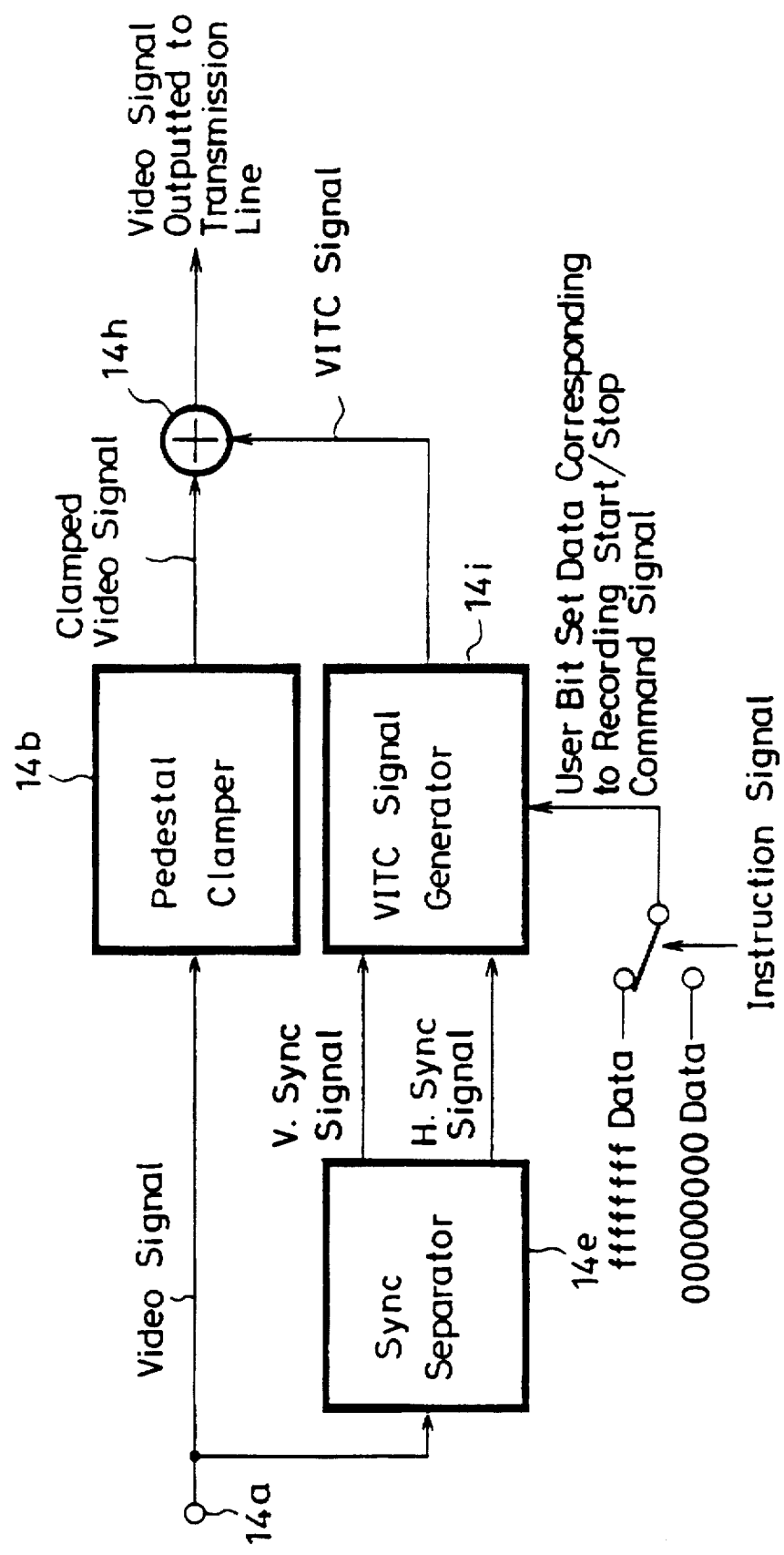
FIG. 8 is a block diagram of a transmitter according to another embodiment of the present invention.
Figure 9:
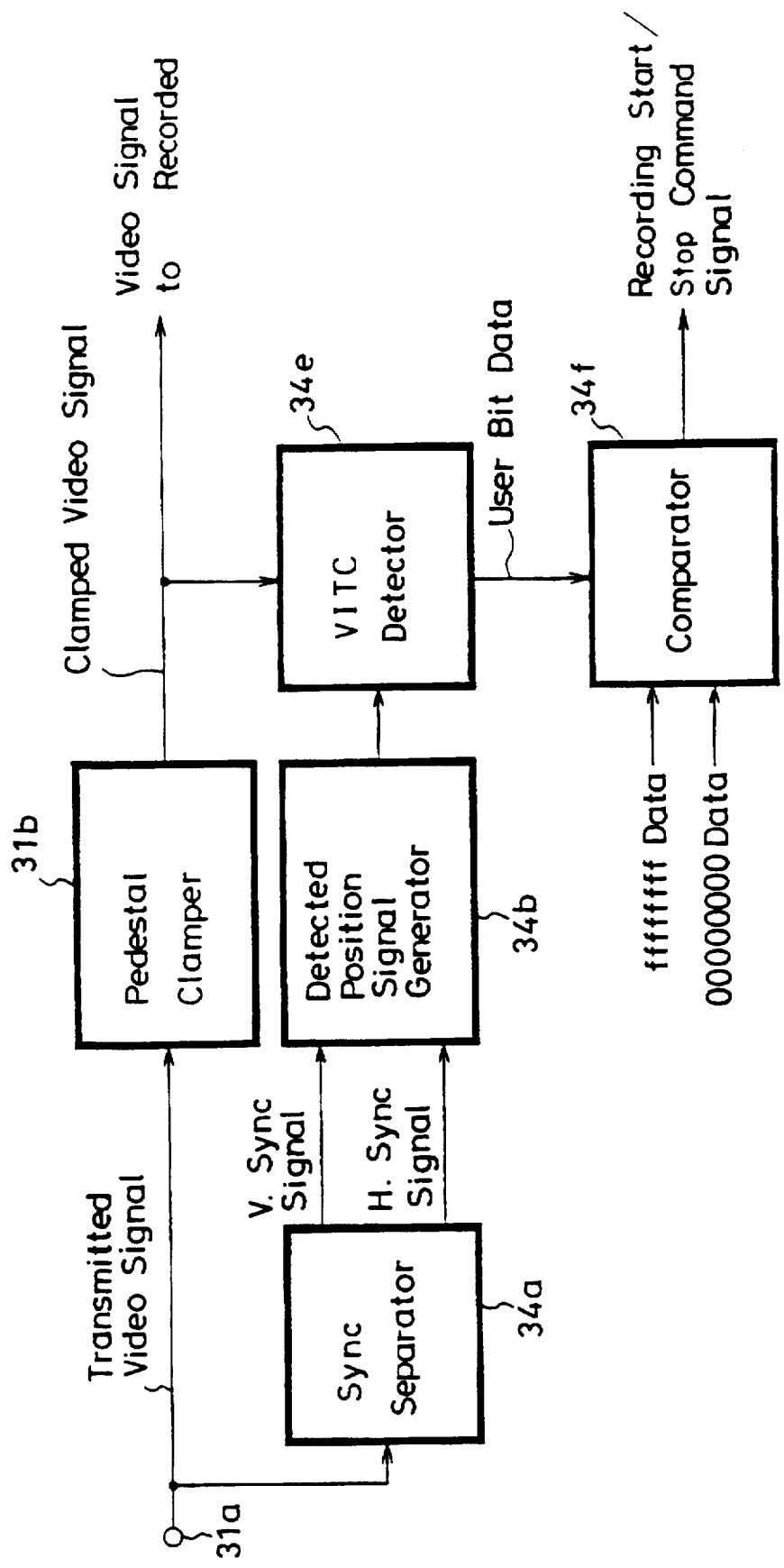
FIG. 9 is a block diagram of a receiver and a reception controller according to another embodiment of the present invention.

FIGS. 8 and 9 show a transmitter, and a receiver and a reception controller, respectively, according to another embodiment of the present invention for generating recording start and stop command signals. In the embodiment shown in FIGS. 8 and 9, suitable codes, e.g., a hexadecimal notation "ffffff" as a recording start command signal and a hexadecimal notation "00000000," as a recording stop command signal are inserted in user bits (11th and 12th lines in a vertical blanking interval) of a VITC (vertical interval time code) of a video signal.

FIG. 8 shows the transmitter in detail. As shown in FIG. 8, the video signal, to be transmitted, from the video/audio signal reproducing device 11 is supplied to a video signal input terminal 14a. The video signal supplied to the video signal input terminal 14a is applied to a pedestal damper 14b which sets the pedestal level, for example, of the supplied video signal to a constant level. The video signal outputted from the pedestal damper 14b is supplied to a terminal of an adder 14h.

The video signal supplied to the video signal input terminal 14a is also supplied to a synchronizing separator 14e, which separates a vertical synchronizing signal and a horizontal synchronizing signal from the supplied video signal. The vertical synchronizing signal and the horizontal synchronizing signal outputted from the synchronizing separator 14e are supplied to a VITC signal generator 14i. The VITC signal generator 14i is also supplied with a recording start command signal, e.g., "ffffff", or a recording stop command signal, e.g., "00000000", selectively from the recording start/stop command signal generator 30.

Figure 10:
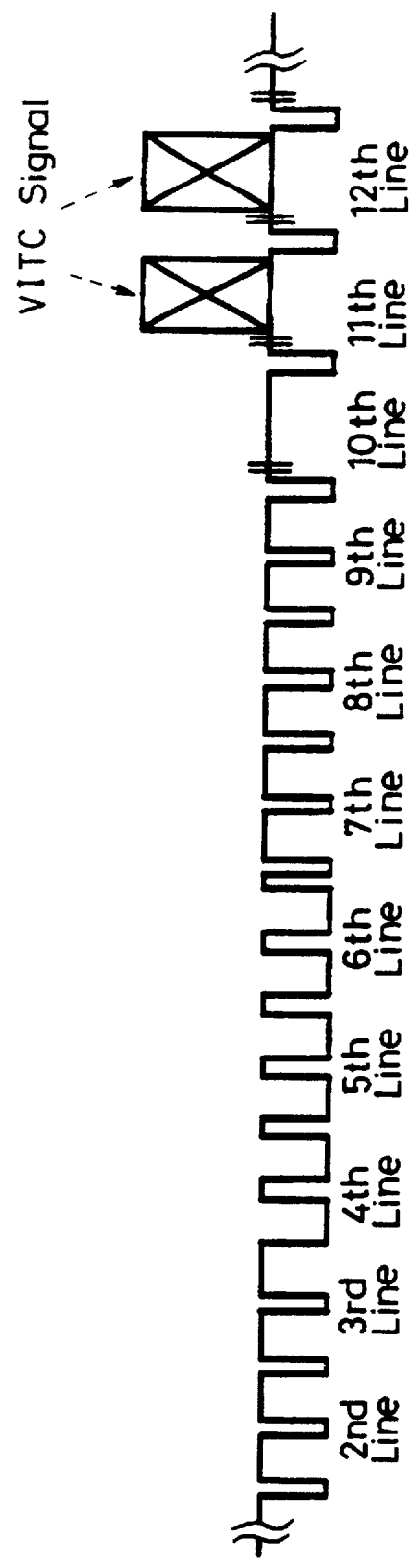
FIG. 10 is a diagram showing the waveform of a signal transmitted by the transmitter shown in FIG. 8.

The VITC signal generator 14i produces a VITC signal as a recording start command signal, e.g., "ffffff", or a recording stop command signal, e.g., "00000000", at a position corresponding to 11th- and 12th line video signal periods in a vertical blanking interval, and supplies the VITC signal to another input terminal of the adder 14h. The adder 14h then produces a video signal with the VITC signal inserted in each of the 11th- and 12th line video signal periods in the vertical blanking interval, as shown in FIG. 10. The video signal outputted from the adder 14h is transmitted over the transmission line.

When the transmitted signal is received by the receiver shown in FIG. 9, the receiver produces recording start and stop command signals from the received signal. As shown in FIG. 9, the video signal received from the transmission line is supplied to a video signal input terminal 31a. The video signal supplied to the video signal input terminal 31a is applied to a pedestal damper 31b which sets the pedestal level, for example, of the supplied video signal to a constant level. The video signal outputted from the pedestal damper 31b is supplied, as a video signal to be recorded, to the video/audio signal recording device 33 and also supplied to a VITC detector 34e.

The video signal supplied to the video signal input terminal 31a is Also supplied to a synchronizing separator 34a, which separates a vertical synchronizing signal and a horizontal synchronizing signal from the supplied video signal. The vertical synchronizing signal and the horizontal synchronizing signal outputted from the synchronizing separator 34a are supplied to a detected position signal generator 34b. The detected position signal generator 34b produces a detected position signal corresponding to 11th- and 12th-line video signal periods, for example, in a vertical blanking interval of the video signal.

The detected position signal outputted from the detected position signal generator 34b is supplied as a detected signal (gate signal) to the VITC detector 34e, which detects (extracts) user bit data and supplies the user bit data to a comparator 34f. The comparator 34f compares the user bit data with the data of "ffffffff" as the recording start command signal and the data of "00000000" as the recording stop command signal to determine whether the user bit data represent a recording start command signal or a recording stop command signal, for thereby controlling the video/audio signal recording device 33 to record or stop recording the video signal.

Figure 11:
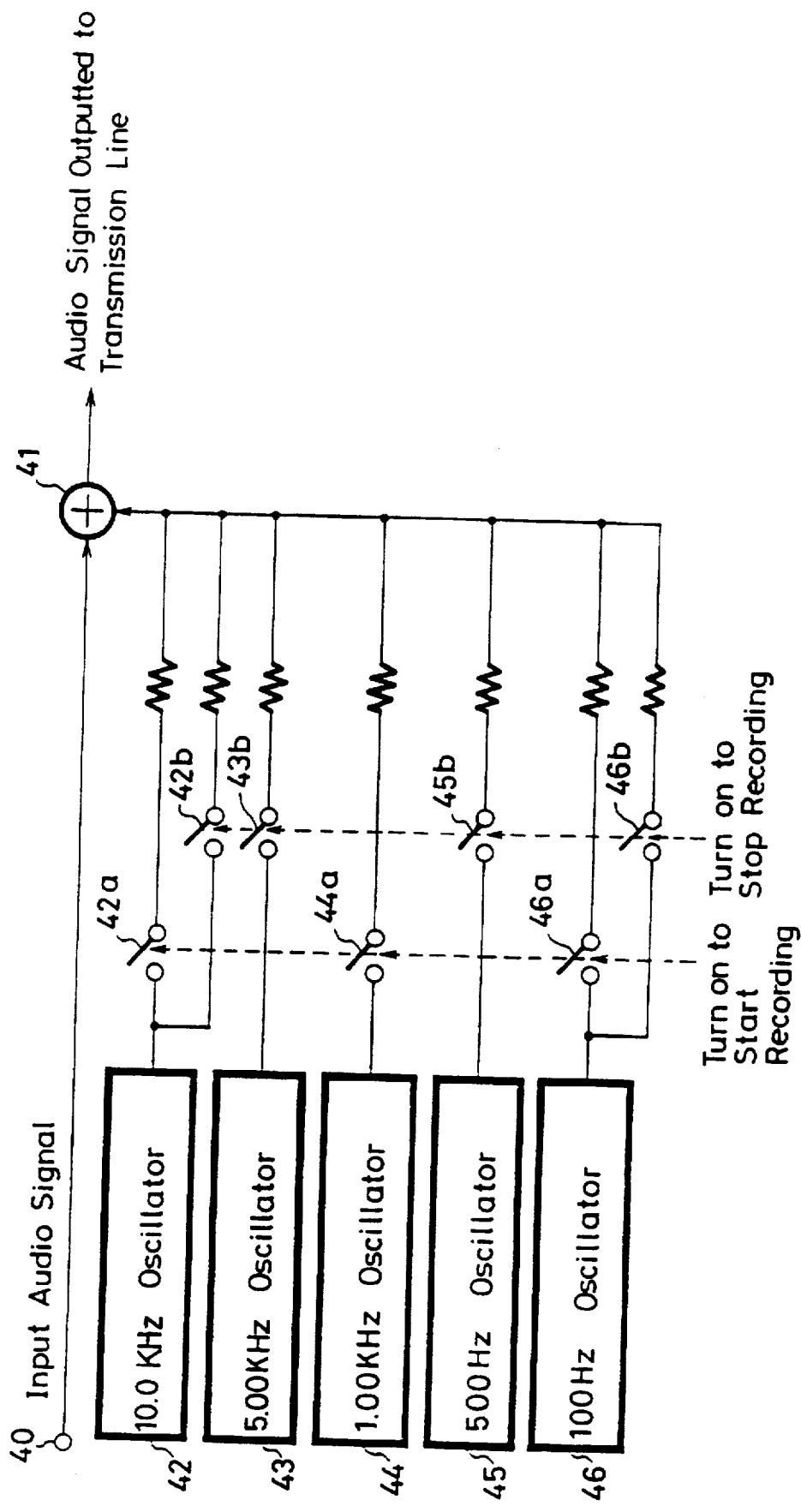
FIG. 11 is a block diagram of a transmission apparatus according to a further embodiment of the present invention.
Figure 12:
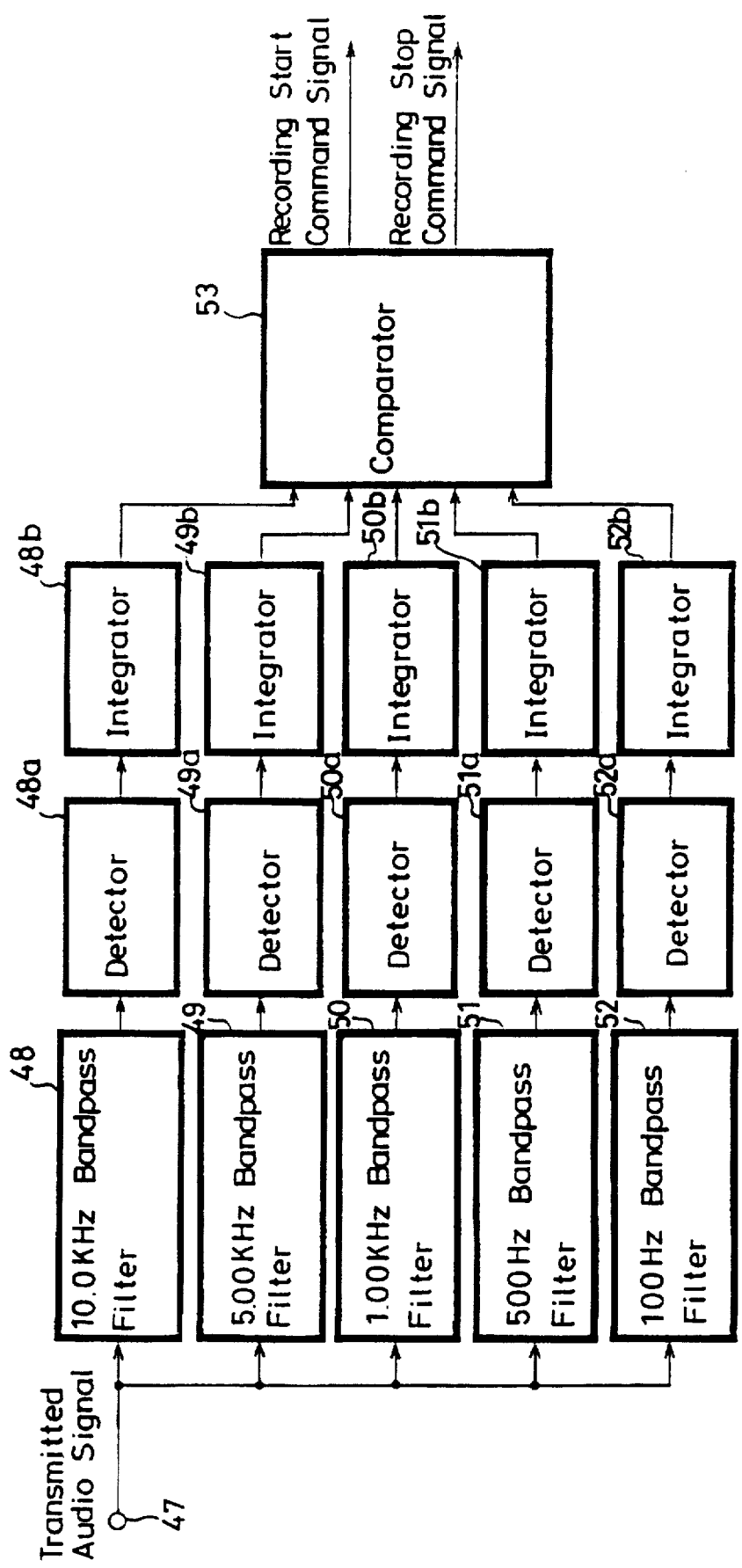
FIG. 12 is a block diagram of a reception apparatus according to the further embodiment of the present invention.

FIGS. 11 and 12 show a transmission apparatus and a reception apparatus, respectively, according to a further embodiment of the present invention. In the embodiment shown in FIGS. 11 and 12, audio signals transmitted as recording start and stop command signals comprise special low-frequency signals distinct from ordinary audio signals, e.g., a plurality of low-frequency signals distinguishable from ordinary audio signals.

FIG. 11 shows the transmission apparatus in detail. As shown in FIG. 11, an audio signal, to be transmitted, from the video/audio signal reproducing device 11 is supplied to an audio signal input terminal 40. The audio signal supplied to the audio signal input terminal 40 is supplied to a terminal of an adder 41. In this embodiment, the recording start/stop command signal generator 30 has five oscillators 42, 43, 44, 45, 46 for generating respective signals at frequencies 10000 Hz, 5000 Hz, 1000 Hz, 500 Hz, and 100 Hz, respectively.

The 1000 Hz frequency signal from the oscillator 42 is supplied to another input terminal of the adder 41 through a switch 42a and a resistor, and also supplied to the other input terminal 41 through a switch 42b and a resistor.

The 5000 Hz frequency signal from the oscillator 43 is supplied to the other input terminal of the adder 41 through a switch 43b and a resistor. The 1000 Hz frequency signal from the oscillator 44 is supplied to the other input terminal of the adder 41 through a switch 44a and a resistor. The 500 Hz frequency signal from the oscillator 45 is supplied to the other input terminal of the adder 41 through a switch 45b and a resistor.

The 100 Hz frequency signal from the oscillator 46 is supplied to the other input terminal of the adder 41 through a switch 46a and a resistor, and also supplied to the other input terminal 41 through a switch 46b and a resistor.

In order to obtain a recording start command signal, the switches 42a, 44a, 46a are turned on or closed to produce a low-frequency signal which comprises a mixture of the 10000 Hz, 1000 Hz, and 100 Hz frequency signals. The low-frequency signal thus produced is added to the audio signal by the adder 41. In order to obtain a recording stop command signal, the switches 42b, 43b, 45b, 46b are turned on or closed to produce a low-frequency signal which comprises a mixture of the 10000 Hz, 5000 Hz, 500 Hz, and 100 Hz frequency signals. The low-frequency signal thus produced is added to the audio signal by the adder 41. The resultant audio signal outputted from the adder 41 is transmitted over the transmission line.

When the transmitted signal is received by the reception apparatus shown in FIG. 12, the reception apparatus produces recording start and stop command signals from the received audio signal. As shown in FIG. 12, the audio signal outputted from the receiver 31 is supplied to an audio signal input terminal 47, from which it is supplied to a bandpass filter 48 for passing a frequency signal of 10000 Hz, a bandpass filter 49 for passing a frequency signal of 5000 Hz, a bandpass filter 50 for passing a frequency signal of 1000 Hz, a bandpass filter 51 for passing a frequency signal of 500 Hz, and a bandpass filter 52 for passing a frequency signal of 100 Hz.

Output frequency signals from the bandpass filters 48, 49, 50, 51, 52 are supplied to a comparator 53 through respective series-connected circuits of envelope detectors 48b, 49a, 50a, 51a, 52a and integrators 48a, 49b, 50b, 51b, 52b.

When the 10000 Hz, 1000 Hz, and 100 Hz frequency signals are supplied respectively from the bandpass filters 48, 50, 52, the comparator 53 outputs a recording start command signal to control the video/audio signal recording device 33 to record the video signal.

When the 10000 Hz, 5000 Hz, 500 Hz, and 100 Hz frequency signals are supplied respectively from the bandpass filters 48, 49, 51, 52, the comparator 53 outputs a recording stop command signal to control the video/audio signal recording device 33 to stop recording the video signal.

Figure 13:
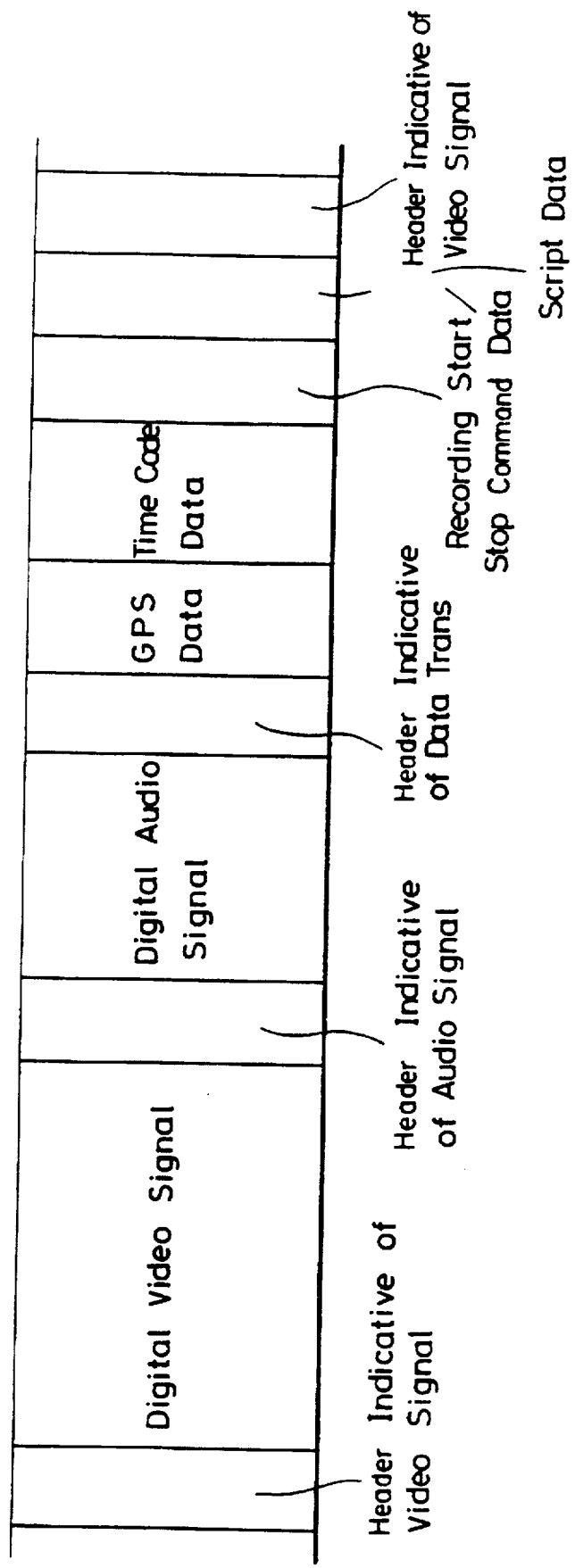
FIG. 13 is a diagram of a multiplex digital signal composed of a digital video signal, a digital audio signal, and a digital data signal which can be transmitted by the information signal transmitting system according to the present invention.

FIG. 13 shows a multiplex digital signal composed of a digital video signal, a digital audio signal, and a digital data signal which can be transmitted by the information signal transmitting system according to the present invention. A hexadecimal notation "ff", for example, may be inserted as a recording start command signal in a certain data transmission area of the multiplex digital signal, and a hexadecimal notation "00", for example, may be inserted as a recording stop command signal in a certain data transmission area of the multiplex digital signal. Accordingly, such recording start and stop command signals may be transmitted with the multiplex digital signal for controlling the video/audio signal recording device 33 in the reception apparatus to record and stop recording the transmitted signal.

In the above embodiments, a recording start command signal or a recording stop command signal is inserted in all areas of an information signal that is transmitted. However, a recording start command signal may be inserted in the beginning area of an information signal that needs to be saved in the reception apparatus, and a recording stop command signal may be inserted in the beginning area of an information signal that does not need to be saved in the reception apparatus.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An information signal transmitting system for transmitting information signals including video and audio signals over a transmission line, comprising:

a transmitting apparatus for transmitting information signals; and a receiving apparatus for receiving information signals transmitted from said transmitting apparatus;

said transmitting apparatus having recording start and stop command signal generating means for generating a recording start command signal and a recording stop command signal, and transmitting means for transmitting a first information signal to be saved in said receiving apparatus with said recording start command signal inserted in said first information signal for at least a predetermined period of time, and for transmitting a second information signal not to be saved in said receiving apparatus with said recording stop command signal inserted in said second information signal for at least a predetermined period of time, said transmitting apparatus further including a signal reproducing device for reproducing the first and second information signals from a recording medium such that an information signal present between said recording stop command signal and said recording start command signal is reproduced from said recording medium using a fast playback operation;

said receiving apparatus having recording start and stop command signal separating means for separating the recording start command signal and the recording stop command signal from the received first and second information signals, and recording means for selectively recording the received first and second information signals depending on the recording start command signal and the recording stop command signal.

2. The information signal transmitting system according to claim 1, wherein said recording start command signal and said recording stop command signal comprise respective signals having respective levels inserted in predetermined video signal periods of a vertical blanking interval of the video signal.

3. The information signal transmitting system according to claim 1, wherein said recording start command signal and said recording stop command signal comprise predetermined codes inserted in user bits of a vertical interval time code.

4. The information signal transmitting system according to claim 1, wherein said recording start command signal and said recording stop command signal comprise low-frequency signals inserted in and distinguishable from the audio signal.

5. The information signal transmitting system according to claim 1, wherein said recording start command signal and said recording stop command signal comprise predetermined codes inserted in data transmission areas of a data transmission signal.

6. An information signal transmitting system for transmitting information signals including video and audio signals over a signal transmission channel, comprising:

a transmitting apparatus for transmitting said information signals; and a receiving apparatus for receiving said information signals transmitted from said transmitting apparatus;

said transmitting apparatus comprising a signal reproducing device for reproducing said information signals, means for generating data indicative of selected ones of said information signals reproduced by said signal reproducing device, said data including a recording start command signal for identifying one information signal to be saved and a recording stop command signal for identifying another information signal to be omitted, a transmission controller having a data memory for storing said data, and means for adding the data read from said data memory to said information signals, said signal reproducing device further including means for stopping a reproduction of said information signals and fast forwarding through an information signal identified by said recording stop command signal;

said receiving apparatus comprising separating means for separating said data form said information signals, and a recording device for selectively recording said information signals based on said data.

* * * * *